(12) United States Patent
Han et al.

(10) Patent No.: US 9,835,766 B2
(45) Date of Patent: Dec. 5, 2017

(54) OPTICAL FILM AND PREPARATION METHOD THEREOF

(75) Inventors: Kweon Hyung Han, Gyeonggi-do (KR); Seong Do Kim, Gyeonggi-do (KR); Heon Jung Shin, Gyeonggi-do (KR); Hyung Suk Pak, Gyeonggi-do (KR)

(73) Assignee: SKC Co., Ltd., Gyeonggi-do (KR)

( * ) Notice: Subject to any disclaimer, the term of this patent is extended or adjusted under 35 U.S.C. 154(b) by 2 days.

(21) Appl. No.: 14/241,598

(22) PCT Filed: Aug. 31, 2012

(86) PCT No.: PCT/KR2012/006988
§ 371 (c)(1),
(2), (4) Date: Jun. 6, 2014

(87) PCT Pub. No.: WO2013/032270
PCT Pub. Date: Mar. 7, 2013

(65) Prior Publication Data
US 2014/0316022 A1    Oct. 23, 2014

(30) Foreign Application Priority Data
Sep. 2, 2011    (KR) .......... 10-2011-0089060

(51) Int. Cl.
*G02B 1/04* (2006.01)
*C08J 5/18* (2006.01)

(52) U.S. Cl.
CPC ...... *G02B 1/04* (2013.01); *C08J 5/18* (2013.01); *C08J 2367/02* (2013.01); *C08J 2433/12* (2013.01); *C08L 2205/22* (2013.01)

(58) Field of Classification Search
CPC .......... C08J 5/18; G02B 1/04; C08L 2205/22
See application file for complete search history.

(56) References Cited

U.S. PATENT DOCUMENTS

| 4,994,312 A * | 2/1991 | Maier | B29C 70/58 215/382 |
| 5,141,685 A * | 8/1992 | Maier | B29C 70/58 264/210.6 |

(Continued)

FOREIGN PATENT DOCUMENTS

| GB | 1563591 | * 3/1980 |
| JP | 2001-342274 | 12/2001 |

(Continued)

OTHER PUBLICATIONS

Translation of JP 2008-161301. Yasuda, M.; Kimura, M.; Nagahara, S. Jul. 2008.*

(Continued)

*Primary Examiner* — Christina Wales
(74) *Attorney, Agent, or Firm* — Alston & Bird LLP (57) ABSTRACT

Disclosed are an optical film and a preparation method thereof. The optical film comprises a base layer, a plurality of polymer particles disposed in the base layer, and voids formed in the base layer and enclosing the respective polymer particles, wherein the polymer particles comprise a crosslinked polymer. The optical film has uniform voids, enhanced processing and dimensional stabilities, as well as improved optical properties such as whiteness, hiding power, reflectance and the like. Thus, the optical film can be useful for a reflector sheet for a BLU of an LCD device, and the like.

11 Claims, 1 Drawing Sheet

(56) References Cited

U.S. PATENT DOCUMENTS

| | | | |
|---|---|---|---|
| 5,275,854 A | 1/1994 | Maier et al. | |
| 5,672,409 A | 9/1997 | Miyakawa et al. | |
| 7,498,125 B2 | 3/2009 | Quintens | |
| 8,794,798 B2 | 8/2014 | Ohira et al. | |
| 2007/0134449 A1* | 6/2007 | Campbell | B32B 27/36 428/32.24 |
| 2009/0042015 A1* | 2/2009 | Ju | C08J 3/226 428/317.9 |
| 2009/0042016 A1 | 2/2009 | Yoshida et al. | |
| 2010/0285302 A1* | 11/2010 | Yoshida | B32B 27/08 428/317.9 |
| 2011/0046254 A1 | 2/2011 | Shin et al. | |
| 2011/0244206 A1* | 10/2011 | Penache | B29B 9/02 428/220 |

FOREIGN PATENT DOCUMENTS

| | | |
|---|---|---|
| KR | 2007-0052859 A | 5/2007 |
| KR | 2011-0019614 A1 | 2/2011 |
| KR | 2011-0023287 A | 3/2011 |
| WO | WO 2011/025336 A2 | 3/2011 |

OTHER PUBLICATIONS

Extended European Search Report for corresponding European Application No. 12828593.9 dated May 27, 2015, 11 pages.
International Search Report for Application No. PCT/KR2012/006988 dated Feb. 22, 2013.
Written Opinion from International Application No. PCT/KR2012/006988 dated Feb. 22, 2013.

* cited by examiner

OPTICAL FILM AND PREPARATION METHOD THEREOF

FIELD OF THE INVENTION

The embodiments of the present invention relate to an optical film and a method for preparing same.

BACKGROUND OF THE INVENTION

Recently, a liquid crystal display (LCD), one of the flat panel display devices, has been most widely used in various applications including laptops, TVs, and automotive GPS systems. Its demand has grown consistently owing to its advantages such as low electrical power consumption, slimness, and high resolution. An LCD, however, is a passive device, which is not capable of emitting light by itself. Hence, it has to use a backlight unit (BLU) as a light source, for which various optical films are employed. Particularly, white porous polyester films have commonly been used as a reflector sheet for a BLU.

There have been disclosed a number of methods available for preparing white porous polyester films. For example, a polyester film can be prepared by mixing a polyester resin with a foaming agent or mixing a polyester resin with a polyolefin resin to form microvoids on the surface and inside of the film. In the method of using a foaming agent, however, it is difficult to uniformly control the size of microvoids if the processing temperature is not carefully adjusted. In the method of mixing a polyester resin with a polyolefin resin, it is difficult to uniformly control the size of microvoids since the polyolefin resin is incompatible with the polyester resin, resulting in film breakage during the drawing step of the film, as well as unsatisfactory whiteness, reflectance and hiding power.

In order to resolve such problems, it has been attempted to employ various compatibilizers. But it has turned out unsatisfactory in commercial processes due to such problems as low heat stability of the compatibilizers and undesired migration thereof to the film surface.

For the purpose of addressing said problems, in the process disclosed in Korean Patent No. 0215496, inorganic particles are added to a mixture of polyester and polyolefin resins so as to secure sufficient porosity and void size.

Further, Korean Laid-open Patent Publication No. 2011-19614 discloses a white porous polyester film comprising a polyester resin, inorganic particles, and a crystalline polymer resin that is incompatible with the polyester resin. However, the size of incompatible crystalline polymer is not uniform in the dispersed phase, which thus forms irregular voids in terms of the size and hinders stable operation of the process. Also, the number of voids per unit area is not enough to produce a film having desirable and uniform reflectance.

SUMMARY OF THE INVENTION

The embodiments of the present invention aim to provide an optical film with enhanced optical properties in terms of porosity, whiteness, hiding power and reflectance.

In one embodiment of the present invention, there is provided an optical film comprising a base layer; a plurality of polymer particles disposed in the base layer; and a plurality of voids formed in the base layer and enclosing the respective polymer particles, wherein the polymer particles comprise a crosslinked polymer.

In preferred embodiments, the crosslinked polymer may be incompatible with the polyester resin. And the base layer may comprise a polyester resin. The crosslinked polymer may comprise a crosslinked thermosetting polymer, the thermosetting polymer being selected from the group consisting of a melamine resin, a phenolic resin, a urea resin, an epoxy resin, a thermosetting unsaturated polyester resin, a silicone resin, a thermosetting polyurethane resin, and a copolymerized resin thereof. The crosslinked polymer may comprise a thermoplastic polymer crosslinked with a crosslinking agent, the thermoplastic polymer being selected from the group consisting of an acrylic resin, a polystyrene resin, a cycloolefin copolymer resin, a thermoplastic polyurethane resin, a nylon resin, a polypropylene resin, a polyethylene resin, a polymethylpentene resin, a polycarbonate resin, a polyacrylonitrile resin, and a copolymerized resin thereof. The crosslinked polymer may comprise a polymethylmethacrylate resin crosslinked with the crosslinking agent.

In preferred embodiments, the base layer may be drawn in at least one direction, and the voids may have a shape elongated in the direction parallel to the direction in which the base layer is drawn. The polymer particles may have a horizontal diameter in the direction parallel to the base layer and a vertical diameter in the direction perpendicular to the base layer, and the ratio of the horizontal diameter to the vertical diameter may be about 1.2:1 to 1:1.2. Each of the voids may have an elliptical cross-sectional shape, the length of the minor axis of the ellipse being 0.1 to 10 µm. The contents of the base layer, the inorganic particles, and the polymer particles may be about 60 to 90 wt %, about 9 to 30 wt %, and about 1 to 10 wt %, respectively, based on the total weight of the optical film. The optical film may have a reflectance of about 97% or more at the wavelength of about 550 nm.

In preferred embodiments, the optical film may further comprise a plurality of inorganic particles disposed in the base layer; and a plurality of second voids formed in the base layer and enclosing the respective inorganic particles.

In preferred embodiments, the polymer particles may have an average particle size of about 0.1 to 10 µm, and the amount of the polymer particles is about 1 to 15 wt % based on the total weight of the optical film.

In another embodiment of the present invention, there is provided a method for preparing an optical film comprising the steps of providing a base resin, a plurality of inorganic particles, and a plurality of polymer particles comprising a crosslinked polymer; mixing the base resin, the inorganic particles, and the polymer particles to obtain a resin composition; forming a sheet by melting, kneading, and extruding the resin composition; and drawing the sheet in at least one direction.

In preferred embodiments, the polymer particles may be prepared by polymerization of a monomer with a crosslinking agent. The polymer particles may maintain their original shapes in solid phase during the melting, kneading and extruding the resin composition. The base resin may comprise a polyester resin, wherein the monomer comprises an acrylic monomer, and wherein the crosslinking agent comprises an acrylic compound having at least two functional groups.

In preferred embodiments, the drawing may be conducted at a draw ratio of about 3 to 6 in each direction.

In preferred embodiments, the drawing may be conducted in at least two stages in each of the longitudinal and transverse directions, the first drawing stage in either direction being conducted at a temperature higher than the Tg of the base resin by 10° C. to 30° C. at a draw ratio of at least 1.5.

In a further embodiment of the present invention, there is provided a reflective film comprising a polyester resin layer, a plurality of polymer particles disposed in the polyester resin layer, and a plurality of voids formed in the polyester resin layer and enclosing the respective polymer particles, wherein the polymer particles comprise a polymethylmethacrylate (PMMA) resin crosslinked with a crosslinking agent and remain in solid phase at a temperature of about 250° C. to 350° C.

The optical films according to various examples of the present invention have a uniform size distribution of polymer particles comprising a crosslinked polymer, which allows formation of uniform voids in terms of the size, stable operation of the process, and improved optical properties such as whiteness, hiding power and reflectance. The optical film can be employed as a reflective film for a BLU in an LCD device.

BRIEF DESCRIPTION OF THE DRAWINGS

The above and other objects and features of the present invention will become apparent from the following description of the invention, when taken in conjunction with the accompanying drawings.

DETAILED DESCRIPTION OF THE INVENTION

Hereinafter, the present invention is described in more detail so as to enable any person skilled in the art to easily understand the invention. However, the present invention is not limited to the following embodiments and may be carried out in other various embodiments.

As used herein, the expression "A comprising B" means that A has B as its component, as well as that A may further have other components than B, unless otherwise stated.

For clear explanation of the present invention, those parts that are not directly related with the explanation are omitted from the drawings. The cross-sectional view is magnified so as to give better understanding of the structure and configuration of the film. The same numerals or symbols are given to the similar elements of the invention throughout the specification.

As used herein, the expression "A is above B" means that A is directly on B, or other elements interpose between A and B while A is above B. Further, the expression "A is on B" indicates that no other elements interpose between A and B while A is above B.

Figure 1:
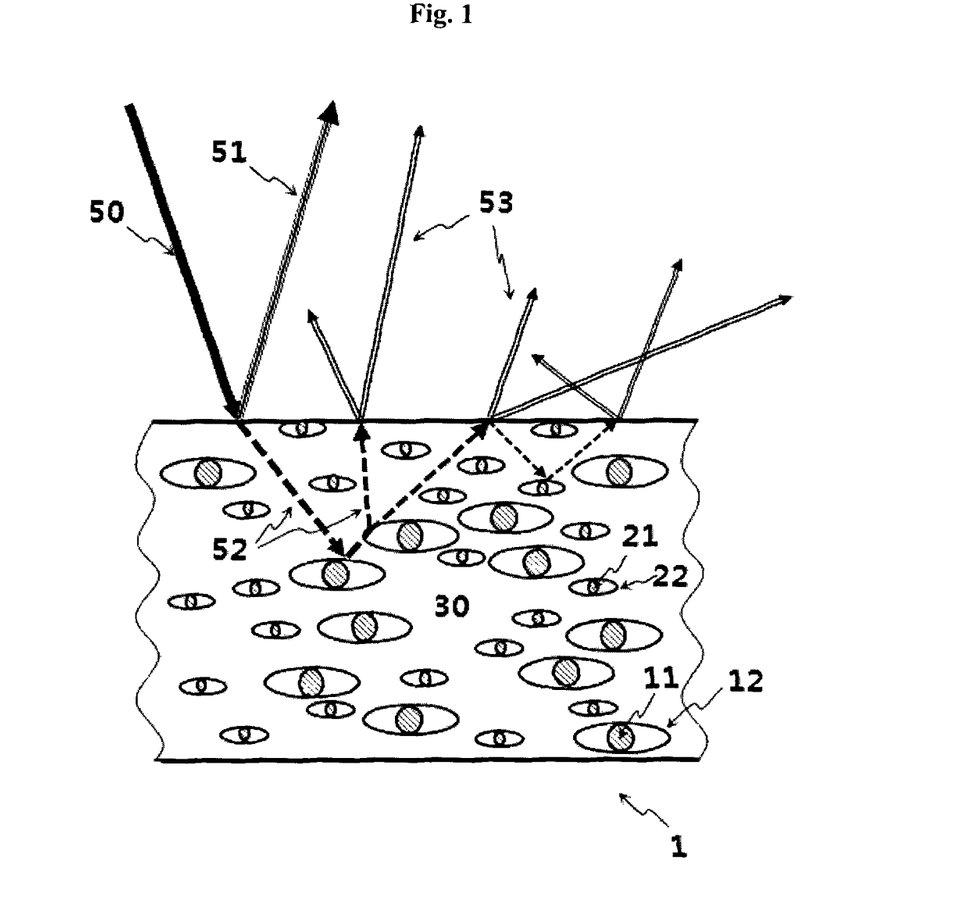
FIG. 1 shows a schematic cross-sectional view of the polyester film according to one embodiment of the present invention, illustrating two kinds of voids formed on the surface and inside of the film by polymer particles and inorganic particles, and the reflection of light by the film (1: optical film, 11: polymer particles, 12: first voids, 21: inorganic particles, 22: second voids, 30: polyester resin, 50: incident ray, 51: reflected ray, 52: transmitted rays, 53: scattered rays)
Figure 2:
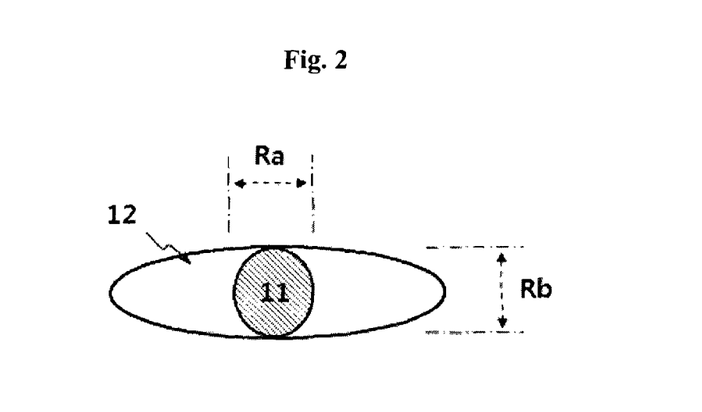
FIG. 2 shows a schematic view of a polymer particle and a void formed thereby (11: polymer particle, 12: first void, Ra: horizontal diameter, Rb: vertical diameter).

With reference to FIGS. 1 and 2, the optical film (1) according to one embodiment of the present invention comprises a base layer (30), a plurality of inorganic particles (21), and a plurality of polymer particles (11).

The inorganic particles (21) and the polymer particles (11) are contained in the base layer (30). The inorganic particles (21) and the polymer particles (11) are disposed in the base layer (30). Specifically, the inorganic particles (21) and the polymer particles (11) may be positioned inside of the base layer (30). More specifically, the inorganic particles (21) and the polymer particles (11) are dispersed uniformly in the base layer (30).

The first voids (12) may be formed, around the respective polymer particles (11). In the base layer (30), the first voids (12) are formed, enclosing the respective polymer particles (11). In the base layer (30), the first voids (12) may be formed, enclosing the outer surfaces of the respective polymer particles (11). In the base layer (30), the first voids (12) may be formed, enclosing the entire or partial outer surfaces of the respective polymer particles (11). The first voids (12) may be formed, between the base layer (30) and the respective polymer particles (11). Specifically, each of the first voids (12) is formed at the interface between the base layer (30) and the polymer particle (11) as the gap between them grows. Further, the second voids (22) are formed, enclosing the respective inorganic particles (21). In the same manner as the formation of the first voids (12), each of the second voids (22) is formed at the interface between the base layer (30) and the inorganic particle (21) as the gap between them grows.

Base Layer

The base layer comprises a base resin. Specifically, the base layer may entirely be comprised of the base resin. The base resin may be a transparent resin. The base resin may be any resin that can be drawn. More specifically, the base resin may be a polyester resin. The thickness of the base layer may be about 50 to 500 μm.

Examples of the polyester resin include polyethylene terephthalate (PET), polyethylene naphthalate (PEN), and a mixture thereof, which may be prepared by condensation polymerization of an acid component comprising an aromatic dicarboxylic acid with a glycol component comprising an alkylene glycol.

Examples of the aromatic dicarboxylic acid include dimethyl terephthalic acid, terephthalic acid, isophthalic acid, dimethyl-2,5-naphthalene dicarboxylic acid, naphthalene dicarboxylic acid, cyclohexane dicarboxylic acid, diphenoxyethane dicarboxylic acid, diphenyl dicarboxylic acid, diphenylether dicarboxylic acid, anthracene dicarboxylic acid, α,β-bis(2-chlorophenoxy)-ethane-4,4-dicarboxylic acid, and a mixture thereof. Also, examples of the alkylene glycol include ethylene glycol, trimethylene glycol, tetramethylene glycol, pentamethylene glycol, hexamethylene glycol, hexylene glycol, and a mixture thereof.

The content of the base resin such as a polyester resin may be about 60 to 90 wt % based on the total weight of the optical film. If the amount of the base resin is less than 60 wt %, it may be difficult to perform the drawing step stably. On the other hand, if the amount of the base resin is greater than 90 wt %, it may be difficult to produce a film having desirable optical properties due to lack of the amount of additives for imparting optical properties to the film.

The base layer may be formed by extrusion and drawing steps. Further, the base layer may be formed by coextrusion and drawing steps.

Polymer Particles

Polymer particles are disposed in the base layer for uniform and effective formation of voids, to thereby control the optical properties of the film such as light transmittance, reflectance, and color tone.

The resin comprised in the polymer particles may be incompatible with the base resin. Particularly, it may be incompatible with the polyester resin. Specifically, the resin comprised in the polymer particles may have an enthalpy for mixing with the base resin, particularly with the polyester resin, of at least 0.2 $(MJm^{-3})^{1/2}$.

Further, the polymer particles have high heat resistance. Specifically, the polymer particles comprise a crosslinked polymer. The crosslinked polymer may have a network structure. The crosslinked polymer has been irreversibly cured and would be neither softened nor melted when heated. Rather, the crosslinked polymer would be decomposed at high temperatures. The crosslinked polymer may be prepared by crosslinking a thermosetting polymer or by crosslinking a thermoplastic polymers with a crosslinking agent.

The polymer particles may be prepared by polymerization, for example emulsion polymerization, of monomers or oligomers. A crosslinking agent may be employed in the polymerization.

The polymer particles would be neither softened nor decomposed at the temperatures for extrusion. Specifically, the polymer particles maintain their original shapes in solid phase at the extrusion temperatures. The temperature for extruding the base resin may be about 200° C. to 350° C. Specifically, in case the base resin is a polyester-based resin, the extrusion temperature may be about 260° C. to 300° C.

The polymer particles would be neither softened nor melted at a temperature of about 250° C. or above. Specifically, the polymer particles may maintain their original shapes in solid phase at a temperature of about 250° C. to 350° C.

Since the polymer particles comprise a crosslinked polymer, they can have high heat resistance, withstand at high temperatures during extrusion, and maintain their original shapes in solid phase. As a result, it may be possible to uniformly control the size distribution of not only the polymer particles but also the voids. If particles of thermoplastic polymer that has not been crosslinked are added during extrusion of the base resin, they would be melted at the high temperatures during the extrusion step. As a result, it may be difficult to uniformly control the size of voids, resulting in uneven size distribution of the dispersed phase and poor reflectance of the film.

Further, no glass transition temperature (Tg) may be measured for the polymer particles. For example, an uncrosslinked PMMA resin shows a Tg of 95° C. to 100° C. when measured by DSC, whereas no Tg may be measured by DSC for a crosslinked PMMA resin.

Addition of the crosslinked polymer particles that are monodisperse in their particle sizes and have high heat resistance to the base resin of the film may produce a dispersed phase uniformly distributed in the base resin like a continuous phase. In other words, small particles uniformly dispersed in the base resin may allow formation of the increased number of small and uniform voids upon the drawing step, to thereby enhance the reflectance of the film. The small size of the particles may also render small the size of the voids subsequently formed. Thus, a film can be prepared at a high drawing ratio in stable operation with reduced deformation and detachment of particles during the drawing step.

As stated above, any resin material that is incompatible with the base resin (e.g., a polyester resin) may be employed for the polymer particles as long as it is crosslinkable by itself or with a crosslinking agent.

Examples of the self-crosslinkable polymer resin comprise a thermosetting polymer selected from the group consisting of a melamine resin, a phenolic resin, a urea resin, an epoxy resin, a thermosetting unsaturated polyester resin, a silicone resin, a thermosetting polyurethane resin, and a copolymerized resin thereof.

Further, examples of the polymer crosslinkable with a crosslinking agent comprise a thermoplastic polymer selected from the group consisting of an acrylic resin, a polystyrene resin, a cycloolefin copolymer resin, a thermoplastic polyurethane resin, a nylon resin, a polypropylene resin, a polyethylene resin, a polymethylpentene resin, a polycarbonate resin, a polyacrylonitrile resin, and a copolymerized resin thereof.

PMMA or a copolymer thereof is preferable as the acrylic resin. PMMA has excellent optical properties and a low refractive index, which imparts high reflectance to the film due to a large difference between the refractive indices of PMMA and the polyester base resin.

Further, an amorphous polymer resin may be employed for the polymer particles.

The polymer particles may preferably be in a spherical shape. Specifically, the polymer particles may preferably have an aspect ratio of about 1:1.2 to 1.2:1. Since the difference in length between the major axis and the minor axis is relatively small, the size of the voids can readily be controlled.

Since the polymer particles maintain their original shapes in solid phase during the extrusion and drawing steps for preparation of the base layer, they would not be elongated in any direction. In other words, since the polymer particles are not softened, they would not be elongated as the base layer is drawn. That is, the polymer particles maintain their shapes that they had when they were added to the base resin.

The polymer particle (11), as shown in FIG. 2, has a horizontal diameter (Ra) in the direction parallel to the base layer (30) and a vertical diameter (Rb) in the direction perpendicular to the base layer (30). In other words, the horizontal diameter (Ra) is measured in the direction parallel to the base layer (30), and the vertical diameter (Rb) is measured in the direction perpendicular to the base layer (30). The ratio of the horizontal diameter (Ra) to the vertical diameter (Rb) may be approximately 1:1. Specifically, the ratio may be about 1.2:1 to 1:1.2.

The polymer particles may have an average particle size, D50, of about 0.1 to 10 μm. If the value is less than about 0.1 μm, it may give rise to problems in dispersing and compounding the particles in the base resin. If the value is larger than about 10 μm, it may cause problems in the drawing step. The average particle size is more preferably about 0.5 to 5 μm, and most preferably about 0.5 to 0.8 μm. Especially, the polymer particles may preferably be monodisperse in their particle size with a particle size dispersity of, e.g., about 0.7 to 0.8.

The amount of the polymer particles is about 1 to 15 wt % based on the total weight of the optical film. If the amount is less than 1 wt %, the effects produced thereby may be insignificant. If the amount exceeds 15 wt %, it may be difficult to draw the extrudate in a sufficient drawing ratio, which is detrimental to such optical properties of the film as reflectance. Preferably, the content of the polymer particles may be about 1 to 10 wt %.

Inorganic Particles

According to one embodiment of the present invention, inorganic particles are used to control such optical properties of the film as light transmittance, reflectance, and color tone, as well as such other properties as frictional coefficient, surface roughness, and tactile sensation. The inorganic particles may be compounded for being added to the base layer. It is preferable to use the inorganic particles in addition to the polymer particles for formation of sufficient voids in the base layer.

The inorganic particles may have a high refractive index. For example, the inorganic particles may have a refractive index of about 2.0 or more. The inorganic particles may be selected from the group consisting of barium sulfate, titanium dioxide, calcium carbonate, silica, kaoline, talc, zeolite, and a mixture thereof.

The inorganic particles may have an average particle size ranging from about 0.1 to 1.2 µm. If the average particle size is less than 0.1 µm, the impact on the optical and surface properties may be insignificant. On the other hand, if the average particle size is greater than 1.2 µm, the optical properties, surface roughness, and drawability of the film may be deteriorated. Preferably, the average particle size of the inorganic particles is from about 0.5 to 0.7 µm.

The inorganic particles may be employed in an amount of about 9 to 30 wt % based on the total weight of the optical film. If the amount is less than 9 wt %, the effects produced thereby would be insignificant. If the amount exceeds 30 wt %, it may be difficult to draw the extrudate in a sufficient drawing ratio, which is detrimental to such optical properties of the film as reflectance.

If necessary, the base layer may further comprise such additives as whitening agents, stabilizers, polycondensation catalysts, dispersants, antistatic agents, crystallization accelerators, antiblocking agents, and lubricants.

Void (First and Second Voids)

The voids formed in the base layer to enclose the respective polymer particles are referred to as "first voids" in this specification. Further, the voids formed in the base layer to enclose the respective inorganic particles are referred to as "second voids." Specifically, the first voids are formed at the interfaces between the base layer and the polymer particles as the gaps between them grow. Further, the second voids are formed at the interfaces between the base layer and the inorganic particles as the gaps between them grow.

Accordingly, the first voids may have a shape monoaxially or multiaxially elongated (stretched). That is, the first voids may have a shape elongated in the direction parallel to the direction in which the base layer is drawn. In other words, each first void extends from each polymer particle in the direction parallel to the direction in which the base layer is drawn.

Similarly, the second voids may have a shape monoaxially or multiaxially elongated (stretched). That is, the second voids may have a shape elongated in the direction parallel to the direction in which the base layer is drawn. In other words, each second void extends from each inorganic particle in the direction parallel to the direction in which the base layer is drawn.

The first and second voids may have an elliptical cross-sectional shape. In such case, the length of the minor axis (i.e., the minor axis of the ellipse) of the first voids enclosing the polymer particles may be about 0.1 to 10 µm, preferably 0.5 to 5 µm. Further, the length of the minor axis (i.e., the minor axis of the ellipse) of the second voids enclosing the inorganic particles may be about 0.1 to 1.2 µm, preferably 0.3 to 0.6 µm.

Especially, the first voids and the second voids may have small and uniform sizes since they are formed by small and uniform particles.

As stated above, two kinds of voids, i.e., the first and the second voids, are formed in the base layer as depicted in FIG. 1.

Specifically, in the optical film in accordance with one embodiment of the present invention, the first voids (12) and the second voids (22) are formed in the base layer (30) by the polymer particles (11) and inorganic particles (21), respectively. Accordingly, when a ray of light is incident upon the surface of the optical film, the incident ray (50) would produce a reflected ray (51) and a transmitted ray (52). The transmitted ray (52) passing through the surface would then be reflected or refracted by any of the polymer particles (11), inorganic particles (21), first voids (12) and second voids (22). As a consequence, the reflected or refracted ray of the transmitted ray (52) returns to the surface of the film and are emitted as a scattered ray (53).

Accordingly, the two kinds of voids (12, 22) formed in the optical film significantly increase the density of voids, which effectively enhances the scattering reflectance of the film. Consequently, the optical properties of the film can be improved, and the phenomenon of bright/dark lines that may be caused by a lamp for a BLU can be prevented.

The optical film in accordance with one embodiment of the present invention may have a whiteness index of at least 95% and a reflectance of about 97% or more at the wavelength of about 550 nm, showing good whiteness, hiding power, and weather resistance.

Further, the optical film in accordance with one embodiment of the present invention may have a density of 0.7 to 1.2 g/cm, exhibiting good lightness, and a thickness of 50 to 500 µm.

The optical film in accordance with one embodiment of the present invention may be comprised of a single layer of the base layer, but is not limited thereto. The optical film may further comprise one or more additional layers above and/or below the base layer. Each additional layer may comprise the same resin as the base resin, or any other resins. Especially, the base layer and the additional layer(s) may be prepared by coextrusion.

Further, the optical film in accordance with one embodiment of the present invention can be used as an optical member for various purposes, e.g., for light control.

Further, the optical film in accordance with one embodiment of the present invention may be a white porous polyester film.

Further, the optical film in accordance with one embodiment of the present invention may be a reflective film.

According to one embodiment, said reflective film may comprise a polyester resin layer, a plurality of cured particles disposed in the polyester resin layer, and voids formed in the polyester resin layer and enclosing the respective cured particles, wherein the cured particles comprise a polymethylmethacrylate resin crosslinked with a crosslinking agent and remain in solid phase in a temperature range between about 200° C. and about 300° C.

Method for Preparing Optical Films

Hereinafter, a method for preparing the optical film in accordance with one embodiment of the present invention is explained.

According to one embodiment of the present invention, the method for preparing the optical film comprises the steps of (a) providing a base resin, a plurality of inorganic particles, and a plurality of polymer particles comprising a crosslinked polymer; (b) mixing the base resin, the inorganic particles, and the polymer particles to obtain a resin composition; (c) forming a sheet by melting, kneading, and extruding the resin composition; and (d) drawing the sheet in at least one direction.

In step (b), the materials employed and the contents thereof are as explained above.

In step (c), since the polymer particles have high heat resistance, they can maintain their original shapes in solid phase, without being softened or decomposed even at a high temperature during the melting, kneading and extruding the resin composition.

In step (d), the sheet may be drawn in each direction at a draw ratio of about 3 to 6, more preferably about 3 to 4.5.

Further, in step (d), the sheet may be drawn in the longitudinal direction, the transverse direction, or both.

Further, in step (d), the drawing step may be conducted in multiple stages, i.e., at least two stages, in order to effectively and stably form voids in the film without film breakage. For example, the drawing step may be conducted in two to four stages in each of the longitudinal and transverse directions. In such case, the first drawing stage in either direction is conducted at a temperature higher than the Tg of the base resin by 10° C. to 30° C. (i.e., Tg+10° C. to Tg+30° C.) at a draw ratio of at least 1.5.

According to another embodiment, the method for preparing the optical film comprises the steps of (a) mixing a polyester resin and inorganic particles, followed by addition thereto of amorphous crosslinked polymer particles having an average particle diameter of 0.1 to 10 μm to obtain a resin composition, wherein the amorphous crosslinked polymer particles are incompatible with the polyester resin and the amount of the amorphous crosslinked polymer particles is 1 to 15 wt % based on the total weight of the resin composition; (b) forming a sheet by melting, kneading, and extruding the resin composition; and (c) drawing the sheet in at least one direction.

The polymer particles used in step (a) can be prepared by any conventional methods such as emulsion polymerization. In such case, a crosslinking agent may be employed if the resin is not self-crosslinkable. In other words, the polymer particles can be formed by polymerization of a monomer with a crosslinking agent.

In a process for preparing the polymer particles, a surfactant is added to a solvent, followed by thorough mixing thereof. Subsequently, an initiator and a monomer are added thereto, followed by mixing thereof. A crosslinking agent may further be added thereto. Upon completion of the reaction, polymer particles comprising crosslinked polymers are formed.

Specifically, the surfactant (i.e., emulsifier) is employed in an amount of about 0.3 to 1 part by weight, based on 100 parts by weight of water. As the amount of surfactant increases, the size of the particles would become smaller with a more uneven particle size distribution. Thus, it is preferred to employ the surfactant in an amount of about 1 part by weight. Subsequently, the temperature is raised to about 70° C. to 80° C., followed by stirring thereof for an hour.

Then, a water-soluble initiator, e.g., potassium persulfate, is added in an amount of about 0.01 to 0.5 parts by weight, followed by stirring thereof. If the content of the initiator is excessive, the uniformity of particle sizes may be impaired owing to an increased degree of polymerization. If the content of the initiator is insufficient, it may deteriorate the heat resistance and physical properties of the film due to a reduced degree of polymerization.

Next, a monomer solution is added to the reaction mixture in an amount of about 1 to 3 parts by weight. In this case, the solid content of the monomer solution may be about 10 to 20 wt %.

Further, a crosslinking agent may be added to the reaction mixture if the monomer employed is not self-crosslinkable. Various multifunctional compounds can be used as a crosslinking agent, including, e.g., acrylic compounds having 2 to 4 functional groups. Specific examples include ethylene glycol dimethacrylate (EGDMA) having 2 functional groups, trimethylolpropane triacrylate (TMPTA) or trimethylolpropane trimethacrylate (TMPTMA) having 3 functional groups, and pentaerythritol tetraacrylate (PETTA) having 4 functional groups. The multifunctional compounds are preferably added in an amount of 1 to 2 parts by weight.

The reaction mixture is then stirred for about 3 to 4 hours for completion of the reaction. The progress of reaction can be monitored by gas chromatography to assay the amount of the monomer (e.g., MMA) remaining in water. The degree of crosslinking also can be monitored by gas chromatograph to determine the amount of the residual crosslinking agent.

Upon completion of the reaction, the solvent is evaporated by drying, and the residue is filtered and sieved to produce polymer particles having a uniform particle size distribution.

The present invention is further described and illustrated in Examples, which, however, are not intended to limit the scope of the present invention.

Preparation Example 1: Polyester Resin (Base Resin)

Dimethyl terephthalate was mixed with ethylene glycol in an equivalent ratio of 1:2. Manganese acetate was added thereto as a transesterification catalyst in an amount of 0.03 wt % based on the total weight of the resulting mixture to obtain bis-2-hydroxyethyl terephthalate as a monomer.

Then, antimony oxide was added thereto as a condensation polymerization catalyst in an amount of 0.05 wt % based on the total weight of the resulting mixture. The mixture was subjected to condensation polymerization to obtain a polyester resin (Tg 78° C.) having an intrinsic viscosity of 0.66 dl/g.

Preparation Example 2: Particles of Crosslinked PMMA

Sodium lauryl sulfate (SLS) as a surfactant was added to water in an amount of 1 wt % based on the total weight of the resulting solution, followed by heating to 70-80° C. and stirring for 1 hour. Subsequently, a water-soluble initiator, potassium persulfate, was added thereto in an amount of 0.01-0.5 wt % based on the total weight of the resulting solution, followed by stirring.

Methyl methacrylate (MMA) as a monomer and ethylene glycol diacrylate (EGDMA) as a crosslinking agent were added in amounts of 1-3 wt % and 1-2 wt %, respectively, based on the total weight of the resulting mixture. Then the mixture was stirred for 3-4 hours for completion of reaction, which was confirmed by gas chromatography.

The solvent was evaporated by drying, then the residue was filtered and sieved to produce polymer particles having a uniform particle size distribution.

Example 1: Preparation of Optical Film 89 wt % of the polyester resin obtained in Preparation Example 1, 10 wt % of barium sulfate having an average particle size of 0.8 µm, and 1 wt % of the crosslinked PMMA particles obtained in Preparation Example 2 having an average particle size (D50) of 0.7 µm were blended in a twin-screw extruder.

The mixture was dried, melted, and extruded in a conventional manner to prepare a sheet.

The sheet was drawn three times in the longitudinal direction at 85° C. and then three times in the transverse direction at 125° C. to produce a biaxially drawn white porous polyester film with a thickness of 125 µm.

Examples 2 to 6 and Comparative Example 1

The procedure of Example 1 was repeated except that the polyester resin and the polymer particles as shown in Table 1 were employed to produce various biaxially drawn films having a thickness of 125 µm.

Comparative Example 2

The procedure of Example 2 was repeated except that an amorphous polystyrene resin (Cheil Industries, Korea) instead of the crosslinked PMMA particles was employed to produce a biaxially drawn film having a thickness of 125 µm.

Comparative Example 3

The procedure of Example 2 was repeated except that a crystalline syndiotactic polystyrene resin (sPS, Idemitsu, Japan) instead of the crosslinked PMMA particles was employed to produce a biaxially drawn film having a thickness of 125 µm.

Comparative Example 4

The procedure of Example 2 was repeated except that an uncrosslinked PMMA resin (LG, MMA) instead of the crosslinked PMMA particles was employed to produce a biaxially drawn film having a thickness 125 µm.

The composition of the films prepared in the Examples 1 to 6 and the Comparative Examples 1 to 4 are summarized in Table 1.

Test

The films obtained in Examples 1 to 6 and Comparative Examples 1 to 4 were evaluated for the following properties, and the results are shown in Table 2.

1) Whiteness Index

The whiteness index of a film was measured in accordance with the ASTM E313 using a spectrophotometer (Hunterlab, USA).

2) Reflectance (%)

The reflectance of a film was measured at the wavelength of 550 nm using a spectrophotometer (Hunterlab, USA).

3) L and b Values of the CIELAB System

The L and b values of a film were measured using a spectrophotometer (Hunterlab, USA).

4) Process Stability

The process stability of a film was determined by measuring the frequency of film breakage during the biaxially drawing step in the process of preparing the film (OO: very good, O: good, X: poor, XX: very poor).

5) Uniformity of Voids

The uniformity of voids was evaluated by examining the cross-sectional SEM images of the film (OO: very good, O: good, X: poor, XX: very poor.)

TABLE 2

| | Whiteness | Reflectance (%) | L | B | Process Stability | Uniformity of voids |
|---|---|---|---|---|---|---|
| Example 1 | 105 | 97.3 | 97.3 | 1.5 | OO | OO |
| Example 2 | 125 | 97.5 | 97.8 | 2.4 | OO | OO |
| Example 3 | 138 | 98.4 | 98.5 | 1.5 | OO | OO |
| Example 4 | 125 | 97.1 | 97.3 | 2.4 | OO | OO |
| Example 5 | 195 | 97.0 | 96.1 | 3.6 | OO | OO |
| Example 6 | 145 | 98.2 | 98.2 | 1.5 | O | O |
| Comp. Ex. 1 | 108 | 96.8 | 95.4 | 4.4 | X | X |
| Comp. Ex. 2 | 78 | 95.2 | 94.2 | −6.4 | XX | XX |
| Comp. Ex. 3 | 90 | 96.3 | 97.3 | −8.2 | XX | XX |
| Comp. Ex. 4 | 84 | 97.0 | 96.5 | −0.4 | XX | XX |

As shown in Table 2, the films of Examples 1 to 6 showed not only improved optical properties such as whiteness and reflectance but also enhanced process stability.

While the invention has been described with respect to the above specific embodiments, it should be recognized that

TABLE 1

| | Polyester resin (wt %) | Inorganic particles (wt %) | Polymer additive | | | |
|---|---|---|---|---|---|---|
| | | | Material | Type | Ave. size (µm) | Content (wt %) |
| Example 1 | 89 | 10 | crosslinked PMMA | particles | 0.7 | 1 |
| Example 2 | 85 | 10 | crosslinked PMMA | particles | 0.7 | 5 |
| Example 3 | 80 | 10 | crosslinked PMMA | particles | 0.7 | 10 |
| Example 4 | 89 | 10 | crosslinked PMMA | particles | 1 | 1 |
| Example 5 | 89 | 10 | crosslinked PMMA | particles | 5 | 1 |
| Example 6 | 75 | 10 | crosslinked PMMA | particles | 0.5 | 15 |
| Comp. Ex. 1 | 89 | 10 | crosslinked PMMA | particles | 12 | 1 |
| Comp. Ex. 2 | 85 | 10 | amorphous PS | resin | — | 5 |
| Comp. Ex. 3 | 85 | 10 | syndiotactic PS | resin | — | 5 |
| Comp. Ex. 4 | 85 | 10 | PMMA | resin | — | 5 | various modifications and changes may be made to the invention by those skilled in the art which also fall within the scope of the invention as defined by the appended claims.

What is claimed is:

1. An optical film comprising:
   a base layer drawn in at least one direction, the base layer comprising a polyester resin;
   a plurality of polymer particles disposed in the base layer, the polymer particles comprising a crosslinked polymer that is immiscible with the polyester resin and having:
   an average particle size of about 0.5 to 0.8 μm,
   a particle size dispersity of about 0.7 to 0.8,
   a horizontal diameter in the direction parallel to the base layer,
   a vertical diameter in a direction perpendicular to the base layer,
   a ratio of the horizontal diameter to the vertical diameter is about 1.2:1 to 1:1.2, and wherein the polymer particles have an enthalpy for mixing with the polyester resin of at least 0.2 $(MJm^{-3})^{1/2}$ the amount of the polymer particles is about 1 to 15 wt % based on the total weight of the optical film; and
   a plurality of first voids formed in the base layer and enclosing the respective polymer particles, the first voids having an elliptical cross-sectional shape in which a length of a minor axis of the ellipse is 0.1 to 10 μm, and wherein the elliptical cross-sectional shape is elongated in a direction parallel to the direction in which the base layer is drawn, and wherein the optical film has a reflectance of about 97% or more at the wavelength of about 550 nm,
   a plurality of inorganic particles disposed in the base layer, the inorganic particles having an average particle sized from about 0.5 to 0.7 μm; and
   a plurality of second voids formed in the base layer and enclosing the respective inorganic particles,
   wherein the contents of the base layer, the inorganic particles, and the polymer particles are about 60 to 90 wt %, about 9 to 30 wt %, and about 1 to 10 wt %, respectively, based on the total weight of the optical film.

2. The optical film of claim 1, wherein the crosslinked polymer comprises a crosslinked thermosetting polymer, the thermosetting polymer being selected from the group consisting of a melamine resin, a phenolic resin, a urea resin, an epoxy resin, a thermosetting unsaturated polyester resin, a silicone resin, a thermosetting polyurethane resin, and a copolymerized resin thereof.

3. The optical film of claim 1, wherein the crosslinked polymer comprises a thermoplastic polymer crosslinked with a crosslinking agent, the thermoplastic polymer being selected from the group consisting of an acrylic resin, a polystyrene resin, a cycloolefin copolymer resin, a thermoplastic polyurethane resin, a nylon resin, a polypropylene resin, a polyethylene resin, a polymethylpentene resin, a polycarbonate resin, a polyacrylonitrile resin, and a copolymerized resin thereof.

4. The optical film of claim 3, wherein the crosslinked polymer comprises a polymethylmethacrylate resin crosslinked with the crosslinking agent.

5. A method for preparing an optical film comprising:
   providing a base resin comprising a polyester resin, a plurality of inorganic particles having an average particle sized from about 0.5 to 0.7 μm, and a plurality of polymer particles comprising a crosslinked polymer, wherein the crosslinked polymer is immiscible with the polyester resin, and has an enthalpy for mixing with the polyester resin of at least 0.2 $(MJm^{-3})^{1/2}$,
   mixing the base resin, the inorganic particles, and the polymer particles to obtain a resin composition;
   forming a sheet by melting, kneading, and extruding the resin composition; and
   drawing the sheet in at least one direction, wherein the optical film comprises a base layer drawn in at least one direction;
   a plurality of polymer particles disposed in the base layer, the polymer particles comprising a crosslinked polymer and having:
   an average particle size of about 0.5 to 0.8 μm,
   a particle size dispersity of 0.7 to 0.8,
   a horizontal diameter in the direction parallel to the base layer,
   a vertical diameter in a direction perpendicular to the base layer,
   a ratio of the horizontal diameter to the vertical diameter is about 1.2:1 to 1:1.2, and wherein the amount of the polymer particles is about 1 to 15 wt % based on the total weight of the optical film;
   a plurality of first voids formed in the base layer and enclosing the respective polymer particles, and a plurality of second voids formed in the base layer and enclosing the respective inorganic particles the first voids having an elliptical cross-sectional shape in which a length of a minor axis of the ellipse is 0.1 to 10 μm, and wherein the elliptical cross-sectional shape is elongated in a direction parallel to the direction in which the base layer is drawn, and wherein the optical film has a reflectance of about 97% or more at the wavelength of about 550 nm, and
   wherein the contents of the base layer, the inorganic particles, and the polymer particles are about 60 to 90 wt %, about 9 to 30 wt %, and about 1 to 10 wt %, respectively, based on the total weight of the optical film.

6. The method of claim 5, wherein the polymer particles are prepared by polymerization of a monomer with a crosslinking agent.

7. The method of claim 6, wherein the polymer particles maintain their original shapes in solid phase during the melting, kneading and extruding the resin composition.

8. The method of claim 7, wherein the base resin comprises a polyester resin,
   wherein the monomer comprises an acrylic monomer, and
   wherein the crosslinking agent comprises an acrylic compound having at least two functional groups.

9. The method of claim 5, wherein the drawing is conducted at a draw ratio of about 3 to 6 in each direction.

10. The method of claim 5, wherein the drawing is conducted in at least two stages in each of the longitudinal and transverse directions, the first drawing stage in either direction being conducted at a temperature higher than the Tg of the base resin by 10° C. to 30° C. at a draw ratio of at least 1.5.

11. A reflective film comprising a polyester resin layer, a plurality of polymer particles that are immiscible with the polyester resin, and inorganic particles having an average particle sized from about 0.5 to 0.7 μm disposed in the polyester resin layer, wherein the polymer particles have an enthalpy for mixing with the polyester resin of at least 0.2 $(MJm^{-3})^{1/2}$, and a plurality of first voids and second voids formed in the polyester resin layer, the first and second voids enclosing the polymer particles and inorganic particles, respectively, wherein the polymer particles comprise a polymethylmethacrylate resin crosslinked with a crosslinking agent and remain in solid phase at a temperature of about 250° C. to 350° C., and wherein polyester resin layer drawn in at least one direction, and the plurality of polymer particles have:
- an average particle size of about 0.5 to 0.8 μm,
- a particle size dispersity of about 0.7 to 0.8,
- a horizontal diameter in the direction parallel to the polyester resin layer,
- a vertical diameter in a direction perpendicular to the polyester resin layer,
- a ratio of the horizontal diameter to the vertical diameter is about 1.2:1 to 1:1.2, and wherein the amount of the polymer particles is about 1 to 15 wt % based on the total weight of the optical film; and the first voids have an elliptical cross-sectional shape in which a length of a minor axis of the ellipse is 0.1 to 10 μm, and wherein the elliptical cross-sectional shape is elongated in a direction parallel to the direction in which the polyester resin layer is drawn, and wherein the optical film has a reflectance of about 97% or more at the wavelength of about 550 nm, and wherein the contents of the base layer, the inorganic particles, and the polymer particles are about 60 to 90 wt %, about 9 to 30 wt %, and about 1 to 10 wt %, respectively, based on the total weight of the optical film.

* * * * *